United States Patent
Cocchi et al.

(10) Patent No.: US 10,570,897 B2
(45) Date of Patent: Feb. 25, 2020

(54) PUMP FOR DISPENSING LIQUID OR SEMI-LIQUID OR SEMI-SOLID FOOD PRODUCTS AND MACHINE COMPRISING SAID PUMP

(71) Applicant: ALI GROUP S.r.l., Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L., Cernusco Sul Naviglio (IT)

(*) Notice: Subject to any disclaimer, the term of this patent is extended or adjusted under 35 U.S.C. 154(b) by 65 days.

(21) Appl. No.: 15/927,489

(22) Filed: Mar. 21, 2018

(65) Prior Publication Data

US 2018/0274537 A1    Sep. 27, 2018

(30) Foreign Application Priority Data

Mar. 22, 2017  (IT) .......................... 102017000031729

(51) Int. Cl.
*F04C 2/12* (2006.01)
*F04C 5/00* (2006.01)
(Continued)

(52) U.S. Cl.
CPC ................ *F04C 2/126* (2013.01); *A23G 9/22* (2013.01); *A23G 9/28* (2013.01); *A23G 9/281* (2013.01);
(Continued)

(58) Field of Classification Search
CPC ...... F04B 45/043; F04B 45/04; F04B 43/026; F04B 43/025; F04B 43/0054;
(Continued)

(56) References Cited

U.S. PATENT DOCUMENTS

| 14,778 | A | * | 4/1856 | Root | .................... | F04B 43/1253 |
| | | | | | | 417/477.6 |
| 125,442 | A | * | 4/1872 | Darker | .................... | B24B 55/00 |
| | | | | | | 418/43 |

(Continued)

FOREIGN PATENT DOCUMENTS

| EP | 1892417 A2 | 2/2008 |
| GB | 899759 A | 6/1962 |

(Continued)

OTHER PUBLICATIONS

Claudio Peri, Fundamental Operations of Food Technology, vol. I: Transport of Fluid and Heat Transfer, pp. 144-147, University Cooperative Study and Work, Milano, Italy, Nov. 1991.

(Continued)

*Primary Examiner* — Patrick M. Buechner
(74) *Attorney, Agent, or Firm* — Shuttleworth & Ingersoll, PLC; Timothy Klima

(57) ABSTRACT

A pump for dispensing semi-liquid food products includes an inlet opening, an outlet opening, a dispensing path between the inlet opening and the outlet opening, a rotor for pushing the product along the dispensing path, and an airtight chamber, interposed between the inlet and outlet openings and coaxially containing the rotor. The dispensing path is defined by a cyclically choked gap formed between an outer periphery of the rotor, including three projecting and angularly equidistant lobes, and an inner periphery of the airtight chamber, which is elastically deformable.

17 Claims, 4 Drawing Sheets

(51) Int. Cl.
*F04C 13/00* (2006.01)
*A23G 9/28* (2006.01)
*A23G 9/22* (2006.01)

(52) U.S. Cl.
CPC ................ *F04C 5/00* (2013.01); *F04C 13/00* (2013.01); *F04C 13/001* (2013.01); *F04C 2240/10* (2013.01); *F04C 2250/20* (2013.01)

(58) Field of Classification Search
CPC .... F04B 43/0045; F04C 18/00; F04C 13/002; F04C 2/126; F04C 13/00; F04C 13/001; F04C 2240/10; F04C 2250/20; F04C 5/00; A23G 9/28; A23G 9/281; A23G 9/22
USPC ........................................................ 418/45
See application file for complete search history.

(56) References Cited

U.S. PATENT DOCUMENTS

| | | | | |
|---|---|---|---|---|
| 271,257 | A * | 1/1883 | Morton | F04B 43/1253 417/475 |
| 551,669 | A * | 12/1895 | Pellows | F04C 23/001 418/5 |
| 2,052,474 | A * | 8/1936 | Johnson | F04C 5/00 418/135 |
| 2,409,688 | A * | 10/1946 | Moineau | F01C 1/101 418/48 |
| 2,911,827 | A * | 11/1959 | Hanks | F03C 7/00 73/262 |
| 3,216,362 | A * | 11/1965 | Hewko | F04B 43/14 417/475 |
| 3,507,585 | A * | 4/1970 | Mercer | F04B 43/0054 417/475 |
| 3,749,531 | A * | 7/1973 | Walker | F04B 43/1253 418/45 |
| 3,771,901 | A * | 11/1973 | Svensson | F04C 5/00 418/156 |
| 5,349,825 | A * | 9/1994 | Duke | A23G 9/20 417/477.9 |
| 10,285,417 | B2 * | 5/2019 | Cocchi | A23G 9/12 |
| 10,321,700 | B2 * | 6/2019 | Cocchi | A23G 9/12 |
| 2006/0051228 | A1 * | 3/2006 | Hayes-Pankhurst | A61M 5/14232 418/61.2 |
| 2011/0243782 | A1 | 10/2011 | Drazkowski | |
| 2014/0348684 | A1 * | 11/2014 | Hayes-Pankhurst | F01C 5/04 418/129 |
| 2014/0348999 | A1 * | 11/2014 | Cocchi | A23G 1/005 426/520 |
| 2015/0129611 | A1 * | 5/2015 | Vulpitta | B67D 1/0001 222/101 |
| 2016/0010634 | A1 * | 1/2016 | Hayes-Pankhurst | F04B 23/12 417/53 |
| 2016/0010643 | A1 * | 1/2016 | Hayes-Pankhurst | F01C 1/3566 418/139 |
| 2016/0010644 | A1 * | 1/2016 | Hayes-Pankhurst | F04C 15/0015 418/125 |
| 2016/0146078 | A1 * | 5/2016 | Bruck | F01N 3/2066 60/299 |

FOREIGN PATENT DOCUMENTS

| | | | |
|---|---|---|---|
| JP | S5654984 A | 5/1981 | |
| WO | WO-2014135563 A1 * | 9/2014 | ............ F04B 23/12 |
| WO | WO2015000037 A1 | 1/2015 | |

OTHER PUBLICATIONS

Italian Search Report dated Jan. 5, 2018 from counterpart Italian App No. IT 201700031729.

* cited by examiner

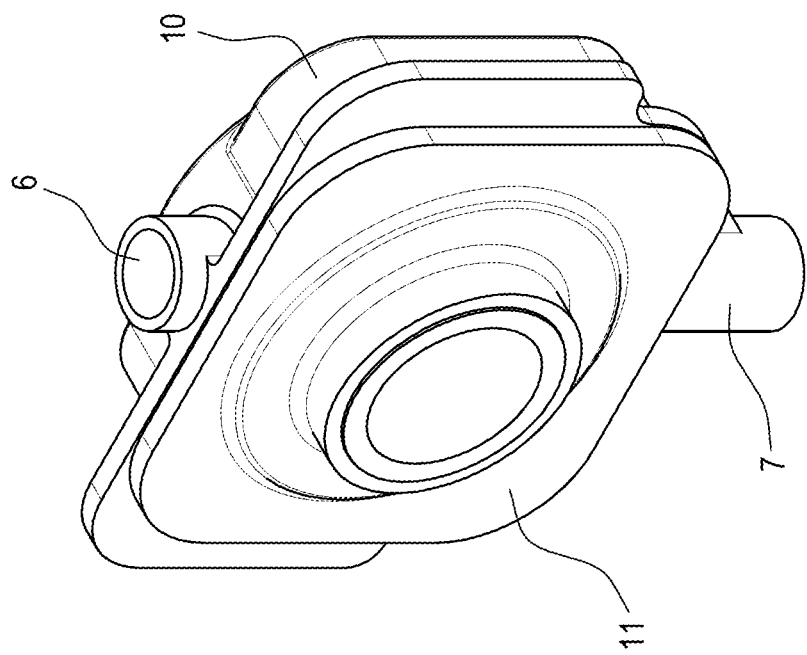
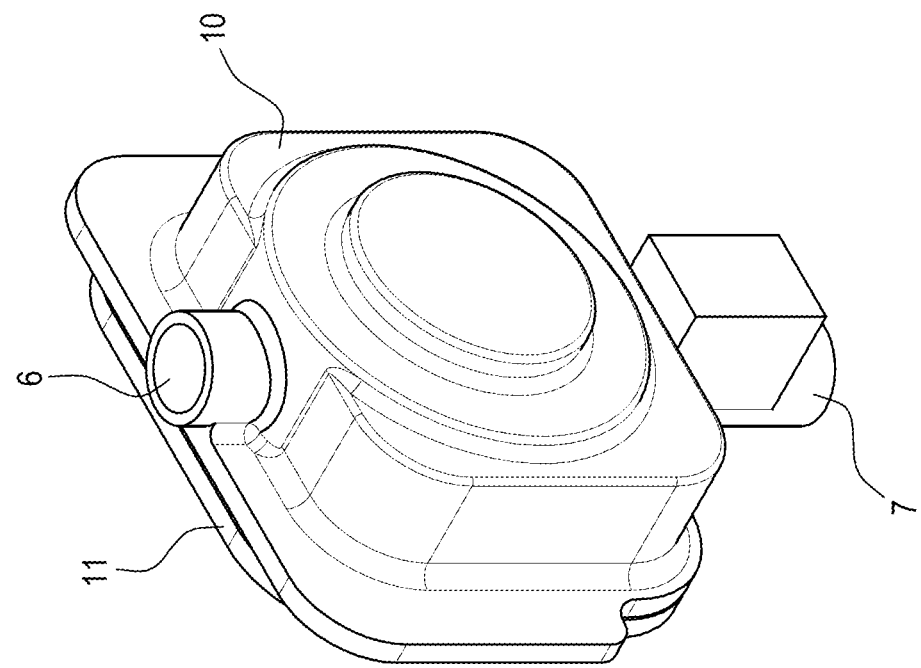

PUMP FOR DISPENSING LIQUID OR SEMI-LIQUID OR SEMI-SOLID FOOD PRODUCTS AND MACHINE COMPRISING SAID PUMP

This application claims priority to Italian Patent Application 102017000031729 filed Mar. 22, 2017, the entirety of which is incorporated by reference herein.

This invention relates to a pump for dispensing liquid, semi-liquid or semi-solid food products and a dispensing machine comprising said pump.

More specifically, this invention relates to the patisserie, ice cream and delicatessen sectors and relates to a pump to be used in machines intended for making and/or dispensing liquid, semi-liquid, semi-solid food products, such as, for example, ice creams, whipped cream, creams, chocolate, yogurt, sorbets and the like.

Generally speaking, such machines comprise a containment chamber for the product to be processed, at least one dispensing tap positioned on the lower front of the chamber.

According to known methods, the product to be dispensed undergoes a thermal treatment which is generally performed by means of electrical resistors and/or a refrigerating system.

The product is thus processed both mechanically, by means of the stirrer, and thermally, by means of heating and/or cooling units.

The processing chamber is usually fed by the operator through a feeding container above.

In some machines of the type described above, product dispensing through the tap is guaranteed by a peristaltic pump, which is controlled by the operator by means of a control located on the front of the machine.

The pumps used in these machines require frequent cleaning operations to prevent the proliferation of bacteria, especially inside the pumping pipe, where product residues easily get trapped.

Normally, cleaning operations involve complete disassembly of the pump and its thorough washing. However, such cleaning operations are quite laborious and time-consuming.

A requirement particularly felt in the sector in question is that of providing a pump which is able to operate particularly effectively with creamy or semi-solid products (such as, for example, creams, chocolates, etc.) having a very high density, and which at the same time is able to reduce the need for cleaning/maintenance.

One aim of this invention is, therefore, to meet the above requirement, that is to say, of providing a pump able to operate particularly effectively with creamy products (such as, for example, creams, chocolates, etc.) having a very high density.

Another aim of this invention is to provide a pump for dispensing liquid, semi-liquid or semi-solid food products that is more easily and rapidly sanitizable than what is provided in the prior art.

Another aim of this invention is to provide a pump for dispensing liquid, semi-liquid or semi-solid food products that is particularly simple and an alternative to those in the prior art.

These aims are fully achieved by the pump according to this invention as characterized in the appended claims.

The technical features and advantages of the invention are more apparent in the following description of a preferred but non-limiting embodiment of it. The description refers to the accompanying drawings, which are also provided purely by way of non-limiting example and in which:

FIGS. 3 and 4 are two perspective views showing opposite sides of the pump of FIG. 1, fully assembled.

Figure 1:
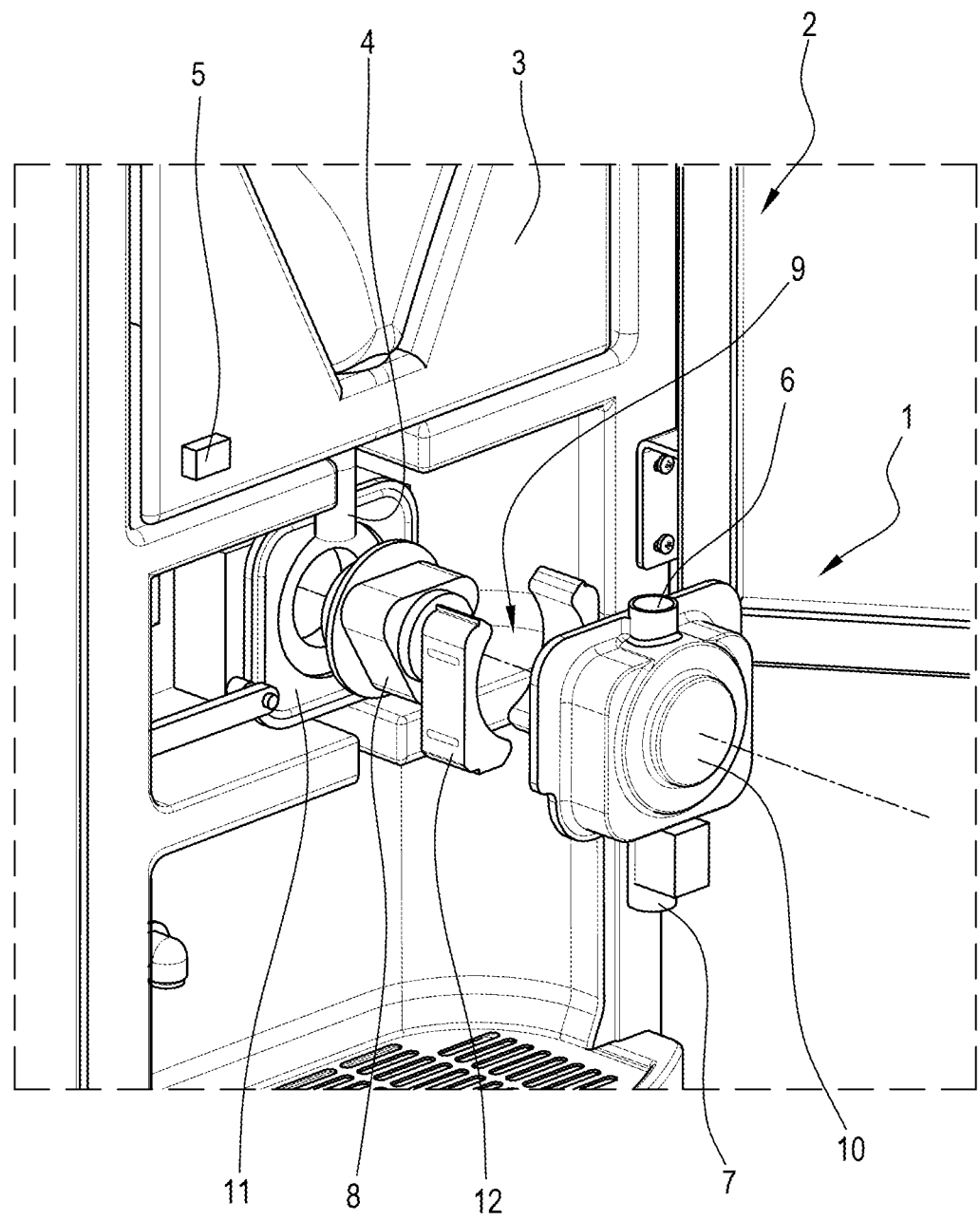
FIG. 1 is an exploded view of a pump made according to this invention, in its intended position in a machine for dispensing liquid or semi-liquid or semi-solid food products.

In FIG. 1, the numeral 1 denotes in its entirety a pump for dispensing liquid, semi-liquid or semi-solid food products.

In the example illustrated, the pump 1 is mounted in a machine 2 that dispenses liquid or semi-liquid or semi-solid food products.

The pump 1 may be similarly applied in other machines in the patisserie, ice cream and delicatessen sectors, for example for dispensing whipped cream, creams, chocolate, yogurt, sorbets, chocolate and the like.

The following is a description of a machine 2, provided by way of example only and without limiting the scope of the invention.

The machine 2 comprises a container 3 for containing the product to be dispensed (located inside a refrigerated chamber), a dispensing pipe 4 (preferably located on the lower front of the container 3).

Preferably, the container 3 is of the deformable type.

According to known methods, the product to be dispensed undergoes a thermal treatment which is generally performed by means of a refrigerating system, in order to preserve the product in food safety conditions.

Product dispensing through the pipe 4 is guaranteed by the pump 1, which is controlled by the operator, for example by means of a button 5 located on the front of the machine.

Figure 5:
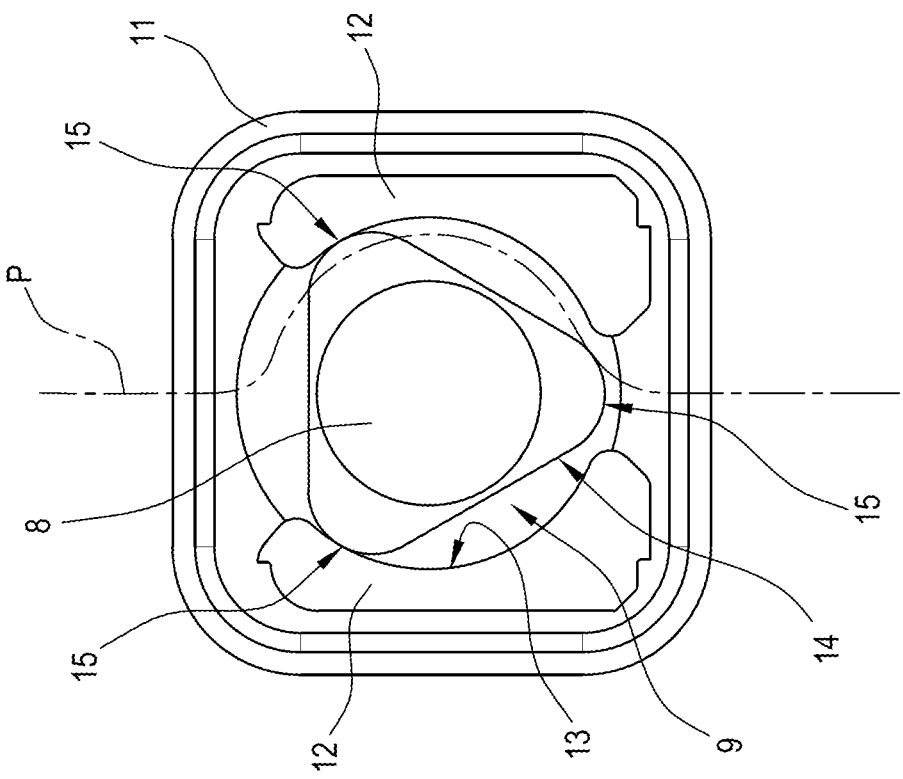

The pump 1 comprises an inlet opening 6, which must be engaged in the tap 4, an outlet opening 7, which constitutes the opening from which the product required by the operator comes out, and a dispensing path P between the inlet opening 6 and the outlet opening 7 (FIG. 5).

The pump 1 also comprises a rotor 8, for pushing the product along the dispensing path P, and an airtight chamber 9, which is interposed between the inlet opening 6 and the outlet opening 7 and contains (coaxially) inside it the rotor 8.

The rotor 8 is electrically driven by a motor (not illustrated), which is operated using a control 5 (said control may be a physical pushbutton or a touch screen or a command issued in any other way).

The chamber 9 is externally enclosed by two rigid half-shells 10 and 11 which are sealedly coupled to each other (FIGS. 3 and 4).

Figure 6:
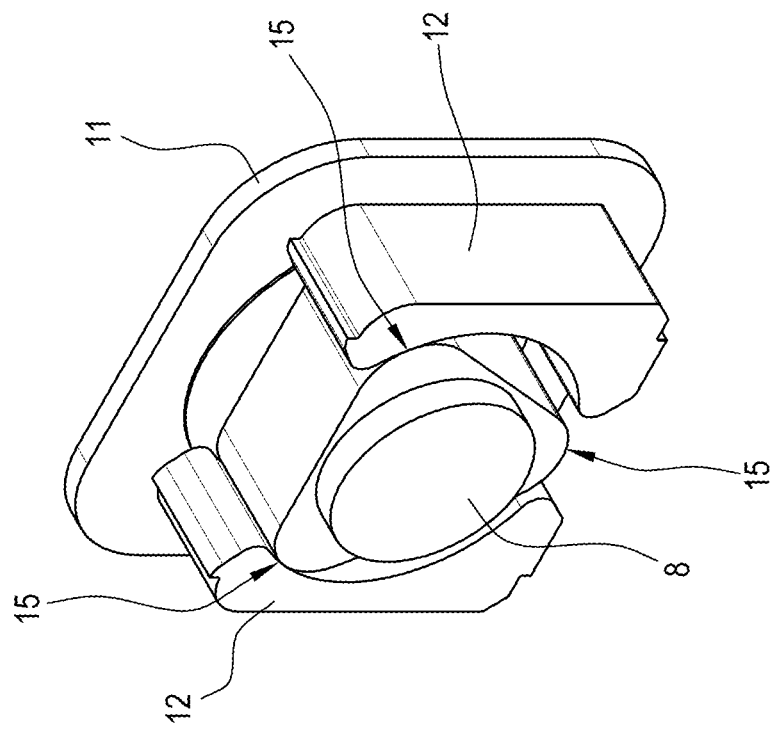
FIGS. 5 and 6 are two views, respectively front and perspective, of several components, assembled, of the pump of FIG. 1.

The half-shells 10 and 11, in their coupled position, house two facing, C-shaped elastomeric elements 12, which delimit a substantially cylindrical central cavity and which define the (elastically deformable) inner periphery 13 of the chamber 9, which is sealedly engaged by the outer periphery 14 of the rotor 8 (FIGS. 5 and 6).

Figure 2:
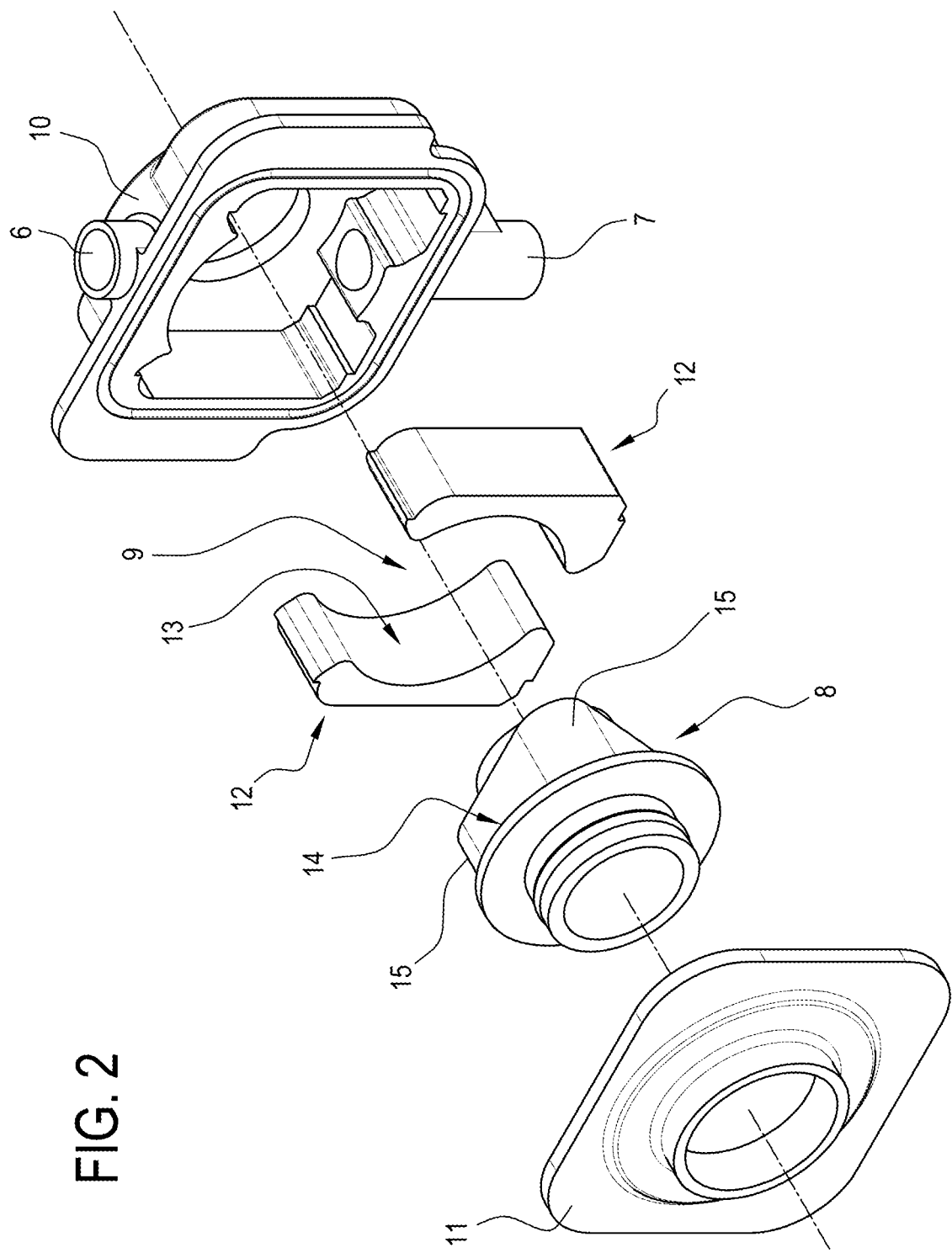
FIG. 2 is a different exploded view of the pump of FIG. 1.

The two elastomeric elements 12 are identical to one another and are housed symmetrically inside the half-shell 10 which, as shown more clearly in FIG. 2, is cup-shaped.

The above-mentioned openings 6 and 7 are made in the half-shell 10.

The dispensing path P is defined by the gap formed between the outer periphery 14 of the rotor 8 and the inner periphery 13 of the chamber 9.

The outer periphery 14 of the rotor 8 has three lobes 15, formed by three protruding portions 15 which are angularly spaced at 120° from each other, and which define a prismatic element with a triangular cross section (preferably equilateral and rounded).

The three lobes 15 are sized to sealedly and rotatably engage each elastomeric element 12.

Differently to a common peristaltic pump, in which the dispensing path P extends inside a pipe that is cyclically choked in order to push the product from the inlet opening towards the outlet opening, in this case the path P extends inside the chamber 9, between the outer periphery 14 of the rotor 8 and the inner surface of the element 12 which is reached in sequence by the lobes 15 of the rotor 8 during the rotation of the latter.

For example, for an observer looking at FIG. 5 and considering a clockwise rotation of the rotor 8, the path P is defined by the cyclically choked gap formed between the rotor 8 and the elastomeric element 12 illustrated on the right.

Therefore, it is the lobes 15 that sealedly engage the inner periphery 13 of the chamber 9 in order to cyclically choke the gap through which the product is dispensed.

In other words, the pump 1 operating concept is similar to that of a peristaltic pump, but it has the advantage of being easy to disassemble into easily washable parts.

Moreover, advantageously, the pump 1 is particularly adapted to moving food products characterised by a higher density.

Finally, it should be noticed that when the rotor 8 is stationary, in any position, there are always two lobes 15 which sealedly press on the corresponding elastomeric elements 12, thereby preventing unwanted product discharge and protecting the chamber 3 from possible product oxidation phenomena.

The invention described above is susceptible of industrial application; It can be modified and adapted in several ways without thereby departing from the scope of the inventive concept; moreover, all the details of the invention may be substituted for technically equivalent elements.

The invention claimed is:

1. A pump for dispensing semi-liquid food products, comprising:
   an inlet opening,
   an outlet opening,
   a dispensing path between the inlet opening and the outlet opening;
   a rotor for pushing the product along the dispensing path, the rotor including an outer periphery;
   an airtight chamber interposed between the inlet and outlet openings, the airtight chamber having an inner periphery, the rotor positioned inside the inner periphery;
   the dispensing path being defined by a gap formed between the outer periphery of the rotor and the inner periphery of the airtight chamber;
   the inner periphery of the airtight chamber being elastically deformable and the outer periphery of the rotor including at least one protruding portion suitable for sealingly engaging the inner periphery of the airtight chamber to cyclically choke the gap;
   two rigid half-shells externally enclosing the airtight chamber, the two rigid half-shells being sealingly coupled to each other;
   two facing elastomeric elements housed within the two rigid half-shells, the two facing elastomeric elements delimiting at least a partially cylindrical central cavity and defining the elastically deformable inner periphery of the airtight chamber which is sealingly engaged by the outer periphery of the rotor.

2. The pump according to claim 1, wherein the two facing elastomeric elements are C shaped.

3. The pump according to claim 1, wherein the two facing elastomeric elements are housed symmetrically inside one of the two rigid half-shells.

4. The pump according to claim 1, wherein the two facing elastomeric elements have, in use, a greater spacing at an inlet region than at a product outlet region.

5. The pump according to claim 1, wherein the at least one protruding portion includes three protruding portions, the three protruding portions being sized to sealingly and rotatably engage each of the two facing elastomeric elements.

6. The pump according to claim 5, wherein the three protruding portions are angularly spaced at 120° from each other.

7. The pump according to claim 5, wherein the three protruding portions define a prismatic element with an equilateral, rounded, triangular, cross section.

8. A machine for dispensing a liquid or semi-liquid or semi-solid product, comprising:
   a containment container for containing the liquid or semi-liquid or semi-solid food product to be dispensed, the containment container including an outlet;
   a pump according to claim 1, the pump including an inlet;
   a dispensing pipe connecting the outlet of the containment container to the inlet of the pump.

9. The machine according to claim 8, and further comprising a refrigerated chamber which houses the containment container.

10. A pump for dispensing semi-liquid food products, comprising:
    an inlet opening,
    an outlet opening,
    a dispensing path between the inlet opening and the outlet opening;
    a rotor for pushing the product along the dispensing path, the rotor including an outer periphery;
    an airtight chamber interposed between the inlet and outlet openings, the airtight chamber having an inner periphery, the rotor positioned inside the inner periphery;
    the dispensing path being defined by a gap formed between the outer periphery of the rotor and the inner periphery of the airtight chamber;
    the inner periphery of the airtight chamber being elastically deformable and the outer periphery of the rotor including at least one protruding portion suitable for sealingly engaging the inner periphery of the airtight chamber to cyclically choke the gap;
    two facing elastomeric elements delimiting at least a partially cylindrical central cavity and defining the elastically deformable inner periphery of the airtight chamber which is sealingly engaged by the outer periphery of the rotor.

11. The pump according to claim 10, wherein the two facing elastomeric elements are C shaped.

12. The pump according to claim 10, wherein the two facing elastomeric elements have, in use, a greater spacing at an inlet region than at a product outlet region.

13. The pump according to claim 10, wherein the at least one protruding portion includes three protruding portions, the three protruding portions being sized to sealingly and rotatably engage each of the two facing elastomeric elements.

14. The pump according to claim 13, wherein the three protruding portions are angularly spaced at 120° from each other.

15. The pump according to claim 13, wherein the three protruding portions define a prismatic element with an equilateral, rounded, triangular, cross section.

16. A machine for dispensing a liquid or semi-liquid or semi-solid product, comprising:
   a containment container for containing the liquid or semi-liquid or semi-solid food product to be dispensed, the containment container including an outlet;
   a pump according to claim 10, the pump including an inlet;
   a dispensing pipe connecting the outlet of the containment container to the inlet of the pump.

17. The machine according to claim 16, and further comprising a refrigerated chamber which houses the containment container.

\* \* \* \* \*